United States Patent [19]
Pajot

[11] Patent Number: 5,348,195
[45] Date of Patent: Sep. 20, 1994

[54] APPARATUS FOR EXTRACTING A SUBSTANCE STORED IN THE DIVIDED STATE IN A SILO

[75] Inventor: Alain D. Pajot, Puteaux, France

[73] Assignee: Symac, Rueil Malmaison, France

[21] Appl. No.: 966,881

[22] Filed: Oct. 27, 1992

[30] Foreign Application Priority Data

Oct. 28, 1991 [FR] France .................. 91 13277

[51] Int. Cl.⁵ .............................................. G01F 11/00
[52] U.S. Cl. ................................. 222/227; 222/236
[58] Field of Search .............. 222/226, 227, 235, 236, 222/238–242

[56] References Cited

U.S. PATENT DOCUMENTS

| | | | |
|---|---|---|---|
| 817,727 | 4/1906 | Sletto | 222/236 |
| 2,509,431 | 5/1950 | Hall et al. | 222/236 X |
| 3,013,701 | 12/1961 | Joschko | 222/236 X |
| 3,038,643 | 6/1962 | Van Der Lely et al. | 222/227 X |
| 3,067,914 | 12/1962 | Ellaby | 222/236 X |
| 3,129,846 | 4/1964 | Van Der Lely et al. | 222/236 X |
| 4,487,339 | 12/1984 | Ellwood | 222/236 |

FOREIGN PATENT DOCUMENTS

| | | | |
|---|---|---|---|
| 493571 | 6/1953 | Canada | 222/227 |
| 1367134 | 8/1963 | France | 222/236 |
| 2296582 | 7/1976 | France | 222/236 |
| 85705 | 6/1955 | Norway | 222/227 |

*Primary Examiner*—Andres Kashnikow
*Assistant Examiner*—Anthoula Pomrening
*Attorney, Agent, or Firm*—Dennison, Meserole, Pollack & Scheiner

[57] ABSTRACT

The invention relates to apparatus for extracting a substance stored in the divided state in a silo. The apparatus includes: a de-bridging system inside a converging bottom portion of the silo; a decompression enclosure at the bottom of the silo and having a diameter greater than the diameter of the end section of the converging portion of the silo; and a drive assembly for driving the substance along a horizontal duct in a direction substantially perpendicular to the vertical axis of the silo which duct is in communication with the bottom end of the decompression enclosure and includes a vertical outlet chute. A rotary loading arm is provided for keeping the drive assembly loaded with the divided substance so long as the divided substance flowing.

6 Claims, 2 Drawing Sheets

APPARATUS FOR EXTRACTING A SUBSTANCE STORED IN THE DIVIDED STATE IN A SILO

The present invention relates to apparatus for extracting a substance stored in the divided state in a silo, and for metering it out by volume.

More precisely, the invention relates to apparatus that enables a substance in the divided state, i.e. a substance in powder or grain form, for example, to be extracted from a storage silo and to be delivered at a substantially constant volume flow rate.

BACKGROUND OF THE INVENTION

There are numerous circumstances in which substances, in particular powders or granulates, are stored in silos or analogous enclosures so as to enable the divided substance to be extracted at will under controlled conditions with a determined quantity thereof being taken. As is known, the substance may be taken either at the outlet from a duct by means of a chute for the purpose of pouring it into a transport vehicle, or else the outlet consists in pipework enabling the divided substance to be conveyed directly to a particular point of use, e.g. some point along an industrial process. For example, this situation occurs in the chemical industry, in the food industry, or more generally in any industry that makes use of granular or powder substances.

In such an industrial situation, it will be understood that not only must the extraction apparatus enable the substance to be extracted in spite of it being possible that the substance might form a bridge, but also that it must enable said powder to be delivered at a substantially constant volume flow rate so as to enable the substance to be input into the industrial process.

French patent No. 75 38506 describes apparatus for fluidizing and extracting a divided substance, with the fluidizing of the substance stored in the silo opposing bridge formation. However that apparatus does not make it possible to control the volume flow rate at which the divided substance is delivered. In the above-described technique for avoiding bridging, the substance is fluidized, and that prevents flow rate being controlled since the apparent density of the divided substance is variable.

According to the above-mentioned French patent, the apparatus for extraction by fluidizing includes a shaft that extends inside the silo and that carries deformable flexible strips that are ballasted at their ends, and that are fixed to the shaft so as to occupy successive planes perpendicular to its axis, the lengths of the strips being no greater than the radial distances between the outsides of the hubs and the bottom wall of the silo.

Apart from the fact that the above system for extracting a divided substance by fluidizing it presents certain drawbacks, and in particular that of requiring the shaft to rotate at a very high speed (about 450 revolutions per minute (rpm)), that apparatus is also incapable of controlling the volume flow rate of the divided substance since it falls directly into drive means disposed at the base of the silo. It will thus be understood that the quantity of divided substance taken by the drive means varies quite substantially in time as a function of normal flow or of bridging phenomena that give rise to very different flow rates for the divided substance.

To remedy those drawbacks, an object of the present invention is to provide apparatus for extracting a substance in the divided state from a silo and for making it possible not only to extract the substance efficiently in spite of bridging phenomena, but also to ensure that the substance extracted in this way has a single and substantially constant flow rate.

SUMMARY OF THE INVENTION

According to the invention, this object is achieved by an apparatus for extracting a substance stored in the divided state in a silo that has a converging extraction bottom portion, and for metering out said substance by volume, wherein the apparatus comprises de-bridging means inside said bottom portion, and further comprises a decompression enclosure disposed at the bottom of said silo and having a diameter greater than the terminal cross-section of said converging portion of the silo with which it is in communication, a drive assembly for driving said substance along a direction substantially perpendicular to the axis of the silo and in communication with the bottom end of the decompression enclosure, and means for keeping said drive assembly loaded while the divided substance is flowing, said means being disposed in the zone where said decompression enclosure opens out into the drive means, whereby a substantially constant density of the divided substance is obtained at the outlet from said drive means.

It will be understood that because of the invention the divided substance as extracted from the silo by the de-bridging means penetrates into the decompression enclosure which allows the extracted substance to decompress regularly. In particular, it will be understood that when in said zone, the divided substance is no longer subjected to the influence of the load constituted by the substance contained in the silo. This thus makes it possible to process a substance that has constant density regardless of filling level, i.e. regardless of the load present in the silo. It will also be understood that the means disposed between the outlet from the decompression zone and the inlet to the drive means make it possible to keep the drive means loaded on a permanent basis during extraction, i.e. they ensure it is completely filled with divided substance. It can thus be seen that at the outlet from the drive means, a volume flow rate is obtained that is indeed substantially constant.

In a preferred embodiment of the invention, the de-bridging means comprise a shaft disposed on the axis of said bottom portion of said silo, a plurality of hubs disposed perpendicularly to said shaft in successive planes, and blades each having one end secured to one of said hubs, the blades being in the form of strips made of semi-rigid material and of length that is no greater than the radial distance between the periphery of the hub and the wall of the silo.

Tests performed with such de-bridging apparatus having semi-rigid blades have shown that its performance was at least equal to that produced by de-bridging apparatuses of the type having ballasted deformable flexible strips, and it has the substantial advantage of being capable of being rotated at a speed that is much less than that required for prior art de-bridging apparatuses, e.g. at about 15 rpm to 50 rpm. In addition, because the speed of rotation of the blades is very significantly reduced, their rate of wear is also reduced. Furthermore, the power requirement of the de-bridging system that combines semi-rigid blades and a low speed of rotation is equivalent to that of a system having flexible blades and is much less than that of a system having rigid blades.

BRIEF DESCRIPTION OF THE DRAWINGS

An embodiment of the invention is described by way of example with reference to the accompanying drawings, in which.

DETAILED DESCRIPTION

Figure 1:
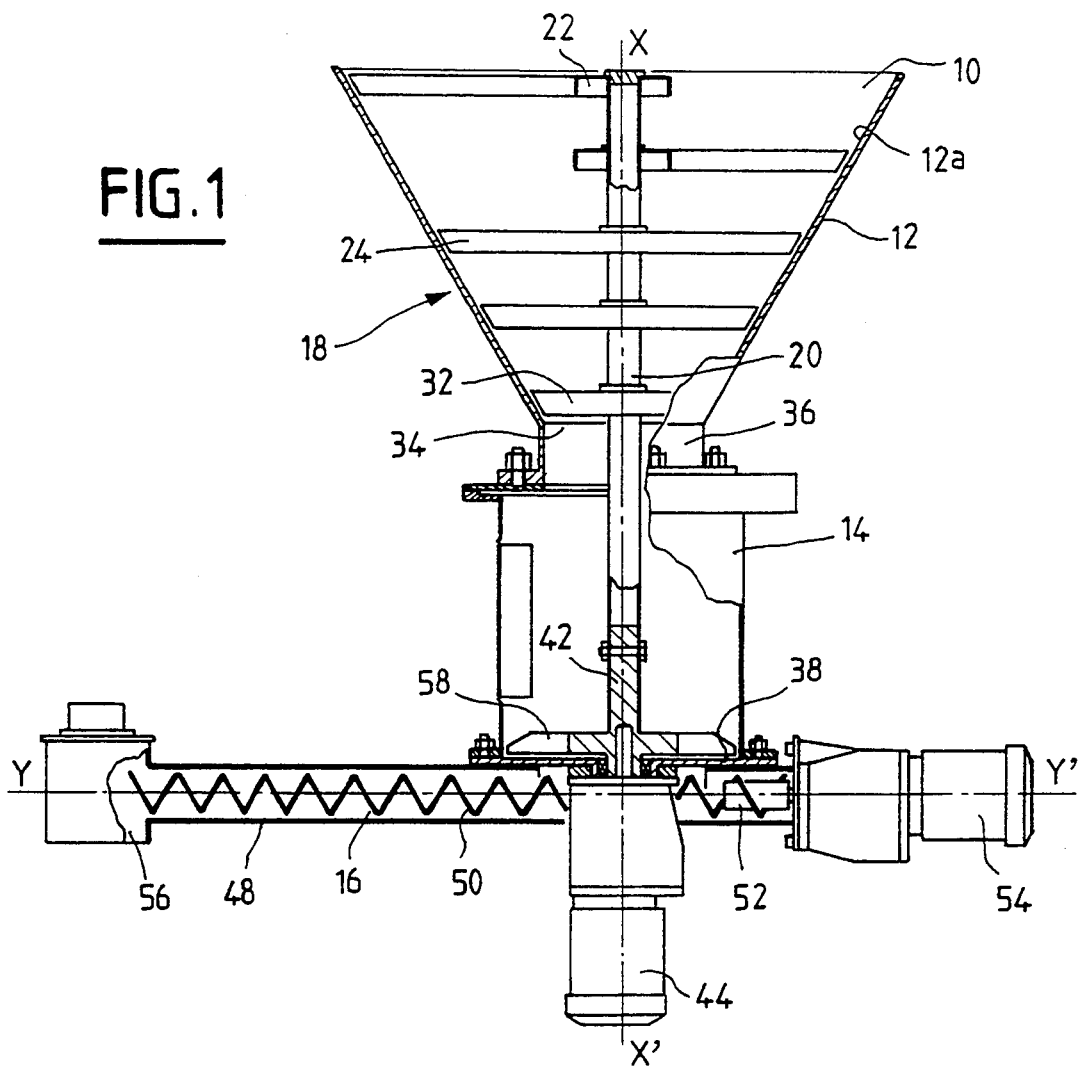
FIG. 1 is a vertical section view through the entire apparatus for extracting and delivering divided substances.

With reference initially to FIG. 1, there follows a description of a preferred embodiment of apparatus for extracting and metering out. The apparatus comprises a silo 10, of which only the conically-shaped bottom portion 12 is shown. It also comprises a decompression cylinder 14 connected to the bottom end of the conical portion 12 of the silo, and a drive system or apparatus 16 disposed at the bottom end of the decompression cylinder. Furthermore, de-bridging apparatus 18 is mounted inside the conical portion 12 of the silo, which de-bridging apparatus is described in greater detail below.

Figure 2:
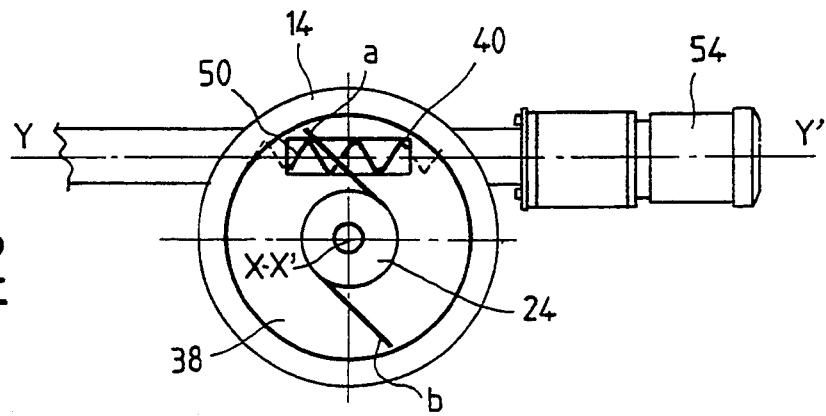
FIG. 2 is a fragmentary plan view showing the drive means, in particular.

The de-bridging system 18 comprises a vertical shaft 20 lying on the axis XX' of the silo 10. The shaft 20 is disposed essentially in the end conical portion 12 of the silo. A plurality of horizontal cylindrical hubs 22, 24, . . . , 32 are fixed on said shaft. Two blades are fixed on the periphery of each of the hubs 22 to 32, and are referenced a and b for each hub. As can be seen more clearly in FIG. 2, each blade has a first end secured to the corresponding hub, e.g. the hub 22, and a second end which is free. Each blade a, b is constituted by a strip of semi-rigid material whose length is not greater than the radial distance between the periphery of its hub and the wall 12a of the silo. The various blades are therefore of different lengths, depending on the positions of the hubs on which they are fixed. Each hub preferably carries two blades, but it could carry some other number of blades. In order to have the required semi-rigid characteristics, the blades may be made of spring steel, of a composite material, or of any other material having similar properties of elasticity. As can be seen in FIG. 1, the hubs are of decreasing diameter going down towards the outlet from the silo 10.

The outlet 34 from the silo is connected to a cylindrical portion 36 of diameter D1. This cylindrical portion 36 of the silo is fixed on said decompression enclosure 14 which has a constant diameter D2 that is significantly greater than the outlet diameter D1 from the silo. As can be seen more clearly in FIG. 2, the bottom 38 of the decompression enclosure 14 has an elongate and substantially rectangular opening 40 which is eccentric relative to the vertical axis XX' of the silo and which is substantially in alignment with the axis YY' of the drive system 16. The vertical shaft 20 is extended by a portion 42 in the decompression cylinder 14, and its end is connected to the outlet shaft of a drive motor 44 disposed beneath the bottom of the decompression cylinder. The drive system 16 is essentially constituted by a cylindrical duct 48 whose axis is the axis YY'. Inside the cylindrical duct 48 there is a driving helix 50 of conventional type, or else any other equivalent means such as an auger, and one end 52 of the drive means is secured to a drive motor 54. At its end opposite from the motor 54, the drive duct 48 of the embodiment shown is provided with a vertical axis outlet chute 56.

In addition, it can be seen that the decompression cylinder 14 has a rotary loading arm 58 disposed close to its bottom 38, which arm 58 is preferably constrained to rotate with the shaft 20. As explained below, the purpose of the arm 58 is to maintain a load permanently on the entire duct 48 of the system for driving the divided product.

There follows a description that begins with the operation of the de-bridging system or de-bridging turbine as formed by the shaft 20, the hubs 22 to 32, and the blades a and b secured to said hubs. When the silo is empty and while the de-bridging turbine is rotating, the blades a and b extend straight in horizontal planes. The same applies when the de-bridging turbine is stationary. When the silo is full and the de-bridging turbine starts to rotate, the presence of the substance to be extracted from the bottom portion of the silo constrains the blades to wind progressively around the hubs to a greater or lesser extent as a function of parameters such as blade length, blade stiffness, and the nature of the substance to be extracted. It is this use of semi-rigid blades that makes it possible to reduce the power required for driving the turbine.

When a bridge begins to form in the portion 12 of the silo, the blade situated at that level encounters less resistance, and may even encounter a void. Because it is semi-rigid, it automatically adjusts its shape and thereby scrapes the bridge formed by the substance, thus causing it to collapse.

Figure 3:
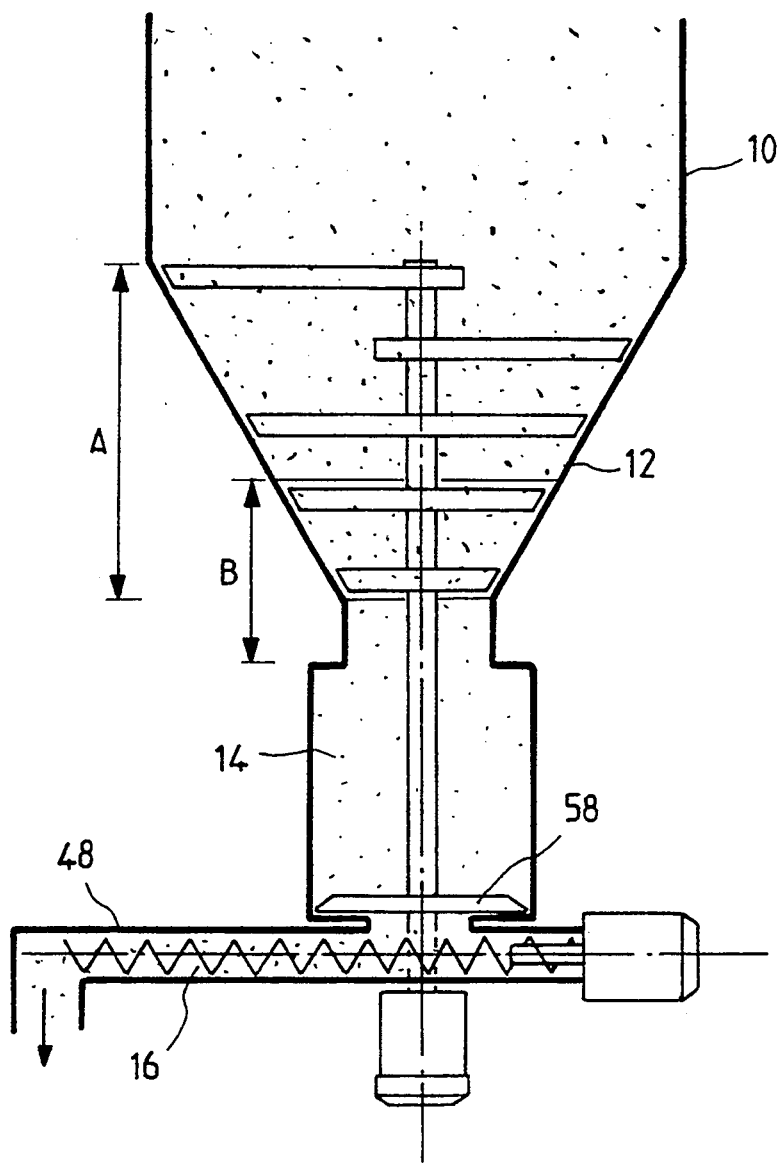
FIG. 3 is a diagrammatic overall view of the installation to explain the principle on which it operates.

With reference now to FIG. 3, the operation of the extraction and metering-out apparatus is described. If a bridge should form, the effect of the de-bridging turbine is to cause the powder substance to fill the bottom portion or all of the conical zone 12 of the silo. In the conical zone 12 of the silo there is a zone A in which the de-bridging turbine is active, and within said zone there is a bottom zone B in which the divided substance is compressed. In this bottom zone B, the extracted substance is thus subjected to compression, thereby ensuring effective separation between the substance stored in the silo 10 and the cylindrical zone 36 of the silo. In the zone 36, a layer of substance is obtained having its density increased by the compression, and therefore having its density stabilized relative to the substance stored above it, which substance may be of varying density depending on the pressure exerted in the silo, particularly as a function of the extent to which it is full, which would cause various different apparent densities to appear that hinder reliable volume-based metering out. The substance then passes from the compression zone into the expansion cylinder 14 whose diameter, as mentioned above, is significantly greater than that of the outlet 34 from the silo. The decompression cylinder enables the substance initially compressed in the zone B to expand regularly. It will thus be understood that the substance penetrating into the cylinder 14 is not influenced by the load created by the substance contained in the silo. In other words, the moving substance that penetrates into the decompression cylinder is decoupled from the substance contained in the silo. This makes it possible to work with substance at constant density regardless of whether the silo is completely full, partially full, or empty. More precisely, the drive system is operated at an apparent density that is substantially constant so long as the compression zone B is in existence, i.e. in practice, until the silo is empty.

At the bottom of the decompression cylinder 14, the loading arm 58 serves to force the substance contained in the bottom portion of the decompression cylinder into the drive system 16 through the orifice 40 formed in the bottom of the decompression cylinder. As a result, the duct 48 of the drive system is kept permanently filled with the substance to be metered out, i.e. permanently loaded. The drive system is thus filled on a permanent basis without any varying pressure being exerted on the substance, because of the decompression cylinder or chamber. It will be understood that a flow of the substance at a regulated apparent density is thus obtained at the outlet from the drive system 16, e.g. at the chute 56. In other words, a regular and reproducible weight of the substance is delivered via the chute 56.

The above description considers the case where the emptying bottom portion 12 of the silo is conical and has the same vertical axis as the main portion of the silo. Naturally, if the bottom portion 12 of the silo were to have some other converging shape, e.g. that of a truncated pyramid or that of an offset Gone, it would not go outside the ambit of the invention. Consequently, the axis of the de-bridging turbine does not necessarily coincide with that of the silo. It may be offset, and indeed it may even be inclined.

I claim:

1. An apparatus for extracting a substance stored in the divided state in a silo including a converging bottom portion having a terminal horizontal opening, said silo having a vertical axis, said apparatus comprising:
   de-bridging means rotatingly mounted about the vertical axis of said silo, within said bottom portion of the silo for de-bridging the substance stored in the silo;
   a decompression enclosure disposed under the bottom portion of the silo and communicating therewith by said terminal horizontal opening, the horizontal cross-section of said decompression enclosure being greater than the horizontal cross-section of said terminal opening wherein divided substance delivered to the decompression enclosure is not subjected to the influence of divided substance in the silo, said decompression enclosure having a bottom end;
   a driving means for driving said substance along a direction substantially perpendicular to the vertical axis of the silo, said driving means communicating with the bottom end of said decompression enclosure and having an outlet; and
   rotating means for keeping said driving means loaded with said substance while said substance is flowing, said rotating means being disposed in the bottom end of the decompression enclosure in a zone in communication with the driving means, whereby the substance delivered at the outlet of said driving means has a substantially constant density.

2. Apparatus according to claim 1, wherein the de-bridging means comprise a shaft disposed on the vertical axis of said bottom portion of said silo, a plurality of hubs disposed perpendicularly to said shaft in successive planes, and blades each having one end secured to one of said hubs, the blades being in the form of strips made of semi-rigid material and of length that is no greater than the radial distance between the periphery of the hub and a wall of the silo.

3. Apparatus according to claim 2, wherein said rotating means comprise a rotary arm mounted to rotate about the vertical axis of said decompression enclosure close to the bottom thereof, said shaft of the de-bridging means is rotated about its axis at a speed lying in the range 15 rpm to 50 rpm, and said bottom portion of the silo is shaped so as to define a bottom compression zone disposed above the decompression enclosure.

4. Apparatus according to claim 1, wherein said rotating means comprise a rotary arm mounted to rotate about the vertical axis of said decompression enclosure close to the bottom thereof.

5. Apparatus according to claim 2, wherein said shaft of the de-bridging means is rotated about its axis at a speed in the range of about 15 rpm to about 50 rpm.

6. An apparatus for extracting a substance stored in the divided state in a silo including a converging bottom portion having a terminal horizontal opening, said silo having a vertical axis, said apparatus comprising:
   de-bridging means rotatingly mounted about the vertical axis of said silo, within said bottom portion of the silo for de-bridging the substance stored in the silo;
   compression zone means beneath and in communication with the terminal opening;
   a decompression enclosure disposed under the bottom portion of the silo and communicating therewith by said terminal horizontal opening and the compression zone means, the horizontal cross-section of said decompression enclosure being greater than the horizontal cross-section of said terminal opening wherein divided substance delivered to the decompression enclosure is not subjected to the influence of divided substance in the silo, said decompression enclosure having a bottom end;
   a driving means for driving said substance along a direction substantially perpendicular to the vertical axis of the silo, said driving means communicating with the bottom end of said decompression enclosure and having an outlet; and
   rotating means for keeping said driving means loaded with said substance while said substance is flowing, said rotating means being disposed in the bottom end of the decompression enclosure in a zone in communication with the driving means, whereby the substance delivered at the outlet of said driving means has a substantially constant density.

* * * * *